United States Patent
Lee et al.

(10) Patent No.: US 8,994,274 B2
(45) Date of Patent: Mar. 31, 2015

(54) DRIVING CIRCUIT FOR DUAL ORGANIC LIGHT EMITTING DIODES, AND DUAL-PIXEL CIRCUIT INCORPORATING THE SAME

(75) Inventors: Kuei-Yu Lee, Chiayi (TW); Paul C. P. Chao, New Taipei (TW)

(73) Assignee: National Chiao Tung University, Hsinchu (TW)

(*) Notice: Subject to any disclaimer, the term of this patent is extended or adjusted under 35 U.S.C. 154(b) by 719 days.

(21) Appl. No.: 13/362,528

(22) Filed: Jan. 31, 2012

(65) Prior Publication Data
US 2012/0306374 A1    Dec. 6, 2012

(30) Foreign Application Priority Data

Jun. 2, 2011 (TW) .............................. 100119419 A (51) Int. Cl.
*H05B 37/00* (2006.01)
*G09G 3/32* (2006.01)
*H05B 33/08* (2006.01)

(52) U.S. Cl.
CPC .......... *G09G 3/3225* (2013.01); *H05B 33/0896* (2013.01); *Y02B 20/36* (2013.01)
USPC ............................................ 315/121; 315/161

(58) Field of Classification Search
USPC .................................. 315/121, 161, 192, 291
See application file for complete search history.

(56) References Cited

U.S. PATENT DOCUMENTS

| | | | |
|---|---|---|---|
| 2009/0026969 A1* | 1/2009 | Joo | 315/169.3 |
| 2012/0112642 A1* | 5/2012 | Ikeda | 315/161 |
| 2013/0076251 A1* | 3/2013 | Lee et al. | 315/173 |
| 2013/0200800 A1* | 8/2013 | Waser | 315/121 |

* cited by examiner

*Primary Examiner* — Hai L Nguyen
(74) *Attorney, Agent, or Firm* — SmithAmundsen LLC; Kelly J. Smith; Dennis J. Schell (57) ABSTRACT

A dual-pixel circuit includes first and second OLEDs, and a driving circuit that includes first and second driving transistors, a capacitor, and a switching module operable between first and second modes based on a data voltage, first and second scan voltages, and first and second bias signals. When the switching module is operated in the first mode, the first OLED is forward-biased to emit light, and the second OLED is reverse-biased. When the switching module is operated in the second mode, the first OLED is reverse-biased, and the second OLED is forward-biased to emit light.

8 Claims, 5 Drawing Sheets

DRIVING CIRCUIT FOR DUAL ORGANIC LIGHT EMITTING DIODES, AND DUAL-PIXEL CIRCUIT INCORPORATING THE SAME

CROSS-REFERENCE TO RELATED APPLICATION

This application claims priority to Taiwanese Application No. 100119419, filed on Jun. 2, 2011.

BACKGROUND OF THE INVENTION

1. Field of the Invention

The invention relates to a pixel circuit for a display, and more particularly to a dual-pixel circuit for an active-matrix organic light emitting display (AMOLED).

2. Description of the Related Art

Figure 1:
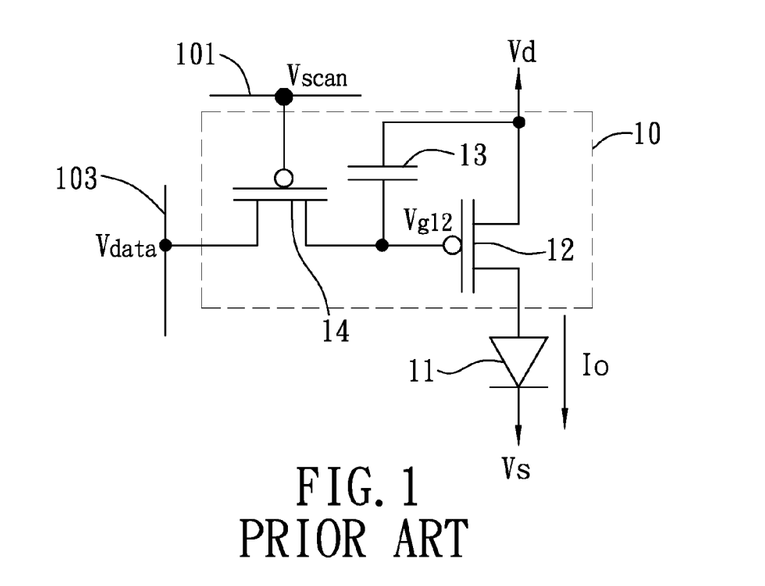
FIG. 1 is a schematic electrical circuit diagram illustrating a conventional pixel circuit for an organic electroluminescent display.

FIG. 1 illustrates a conventional pixel circuit for an organic electroluminescent display (not shown). The conventional pixel circuit is formed in a region where a scan line 101 intersects a data line 103, and includes a driving circuit 10, and an organic light emitting diode (OLED) 11.

The OLED 11 has an anode, and a cathode receiving a low-level bias voltage (Vs).

The driving circuit 10 includes first and second thin film transistors (TFT) 12, 14, and a capacitor 13. The first TFT 12 has a first end for receiving a high-level bias voltage (Vd), a second end coupled to the anode of the OLED 11, and a control end receiving a control voltage ($V_{g12}$) such that the OLED 12 is operable between an ON-state and an OFF-state in response to the control voltage ($V_{g12}$). The capacitor 13 is coupled between the first end and the control end of the first TFT 12. The second TFT 14 has a first end connected to the data line 103 to receive a data voltage (Vdata) supplied therefrom, a second end coupled to the control end of the first TFT 12, and a control end connected to the scan line 101 to receive a scan voltage (Vscan) supplied therefrom such that the second TFT 14 is operable between an ON-state and an OFF-state in response to the scan voltage (Vscan).

When the second TFT 14 is operated in the ON-state, the data voltage (Vdata) is transmitted to the control end of the first TFT 12 through the second TFT 14, and serves as the control voltage ($V_{g12}$) such that the capacitor 13 is charged to thereby obtain a voltage across the capacitor 13 equal to Vd–Vdata. Thereafter, when the second TFT 14 is switched from the ON-state to the OFF-state, the voltage across the capacitor 13 is maintained. Thus, if a potential difference between the first end and the control end of the first TFT 12, i.e., the voltage across the capacitor 13, is greater than a threshold voltage of the first TFT 12, the first TFT 12 produces a driving current (Io) that is proportional to the voltage across the capacitor 13 and that flows to the OLED 11 to control brightness gray levels thereof. Since the OLED 11 is continuously provided with the driving current (Io), the OLED 11 easily degrades to thereby reduce the lifetime thereof. As such, the AMOLED cannot substitute for an LCD display.

Figure 2:
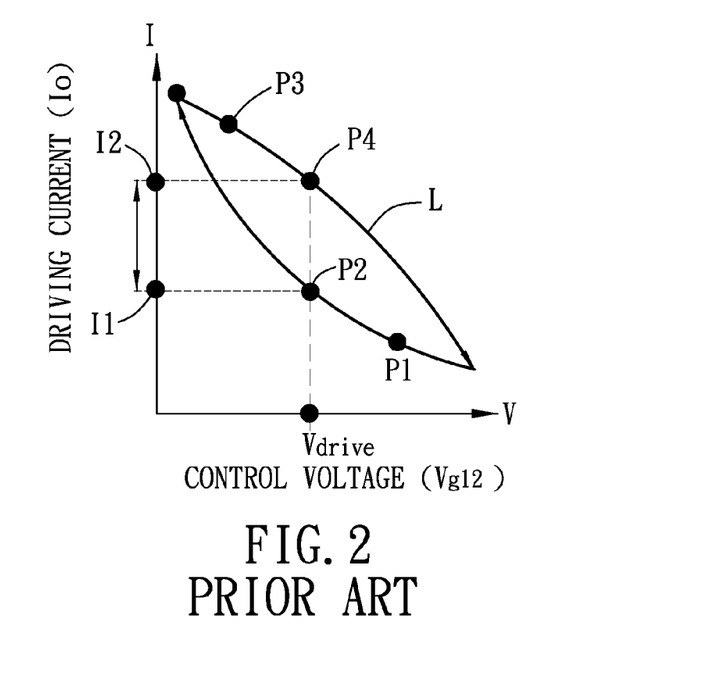
FIG. 2 is a plot illustrating a hysteresis effect on a thin film transistor of the conventional pixel circuit.

Referring to FIG. 2, a hysteresis effect on the first TFT 12 is shown to illustrate the relationships between the control voltage ($V_{g12}$) and the driving current (Io) in accordance with a hysteresis loop (L). For example, it is assumed that the first TFT 12 can be driven to conduct when the control voltage ($V_{g12}$) is at $V_{drive}$. However, due to the hysteresis effect, the driving current (Io) becomes I1 when the control voltage ($V_{g12}$) transfers from a high potential corresponding to a point (P1) on the hysteresis loop (L) to a relatively lower potential, i.e., $V_{drive}$, corresponding to a point (P2) on the hysteresis loop (L) or becomes I2 when the control voltage ($V_{g12}$) transfers from a low potential corresponding to a point (P3) on the hysteresis loop (L) to a relatively higher potential, i.e., $V_{drive}$, corresponding to a point (P4) on the hysteresis loop (L), wherein I2 is greater than I1. As a result, when the control voltage ($V_{g12}$) is at $V_{drive}$, the OLED 11 emits light at various brightness, thereby resulting in non-uniformity of the organic electroluminescent display.

Therefore, improvements may be made to the above techniques.

SUMMARY OF THE INVENTION

Therefore, an object of the present invention is to provide a driving circuit for dual organic light emitting diode, and a dual-pixel circuit incorporating the same that can overcome the aforesaid drawbacks of the prior art.

According to one aspect of the present invention, a dual-pixel circuit comprises:

a pair of first and second organic light emitting diodes (OLEDs), each of the first and second OLEDs having an anode, and a cathode adapted for receiving a low-level bias voltage; and a driving circuit including a first driving transistor having a first end adapted for receiving a high-level bias voltage, a second end coupled to the anode of the first OLED, and a control end, a second driving transistor having a first end adapted for receiving the high-level bias voltage, a second end coupled to the anode of the second OLED, and a control end, a capacitor coupled between the control ends of the first and second driving transistors, and a switching module coupled to the anodes of the first and second OLEDs and to the control ends of the first and driving transistors, the switching module being adapted to receive a data voltage, a first scan voltage, a second scan voltage, a first bias signal and a second bias signal such that the switching module is operable, based on the first and second scan voltages, and the first and second bias signals, between a first mode and a second mode.

When the switching module is operated in the first mode, the switching module transmits the data voltage to the control end of the first driving transistor to conduct the first driving transistor such that the first OLED is forward-biased to emit light, and transmits the first bias signal to the anode of the second OLED such that the second OLED is reverse-biased.

When the switching module is operated in the second mode, the switching module transmits the data voltage to the control end of the second driving transistor to conduct the second driving transistor such that the second OLED is forward-biased to emit light, and transmits the second bias signal to the anode of the first OLED such that the first OLED is reverse-biased.

According to another aspect of the present invention, there is provided a driving circuit for a pair of first and second organic light emitting diodes (OLEDs). Each of the first and second OLEDs has an anode, and a cathode for receiving a low-level bias voltage. The driving circuit comprises:

a first driving transistor having a first end adapted for receiving a high-level bias voltage, a second end adapted to be coupled to the anode of the first OLED, and a control end;

a second driving transistor having a first end adapted for receiving the high-level bias voltage, a second end adapted to be coupled to the anode of the second OLED, and a control end;

a capacitor coupled between the control ends of the first and second driving transistors; and a switching module adapted to be coupled to the anodes of the first and second OLEDs and to the control ends of the first and driving transistors, the switching module being adapted to receive a data voltage, a first scan voltage, a second scan voltage, a first bias signal and a second bias signal such that the switching module is operable, based on the first and second scan voltages, and the first and second bias signals, between a first mode and a second mode.

When the switching module is operated in the first mode, the switching module transmits the data voltage to the control end of the first driving transistor to conduct the first driving transistor such that the first OLED is forward-biased to emit light, and transmits the first bias signal to the anode of the second OLED such that the second OLED is reverse-biased.

When the switching module is operated in the second mode, the switching module transmits the data voltage to the control end of the second driving transistor to conduct the second driving transistor such that the second OLED is forward-biased to emit light, and transmits the second bias signal to the anode of the first OLED such that the first OLED is reverse-biased.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
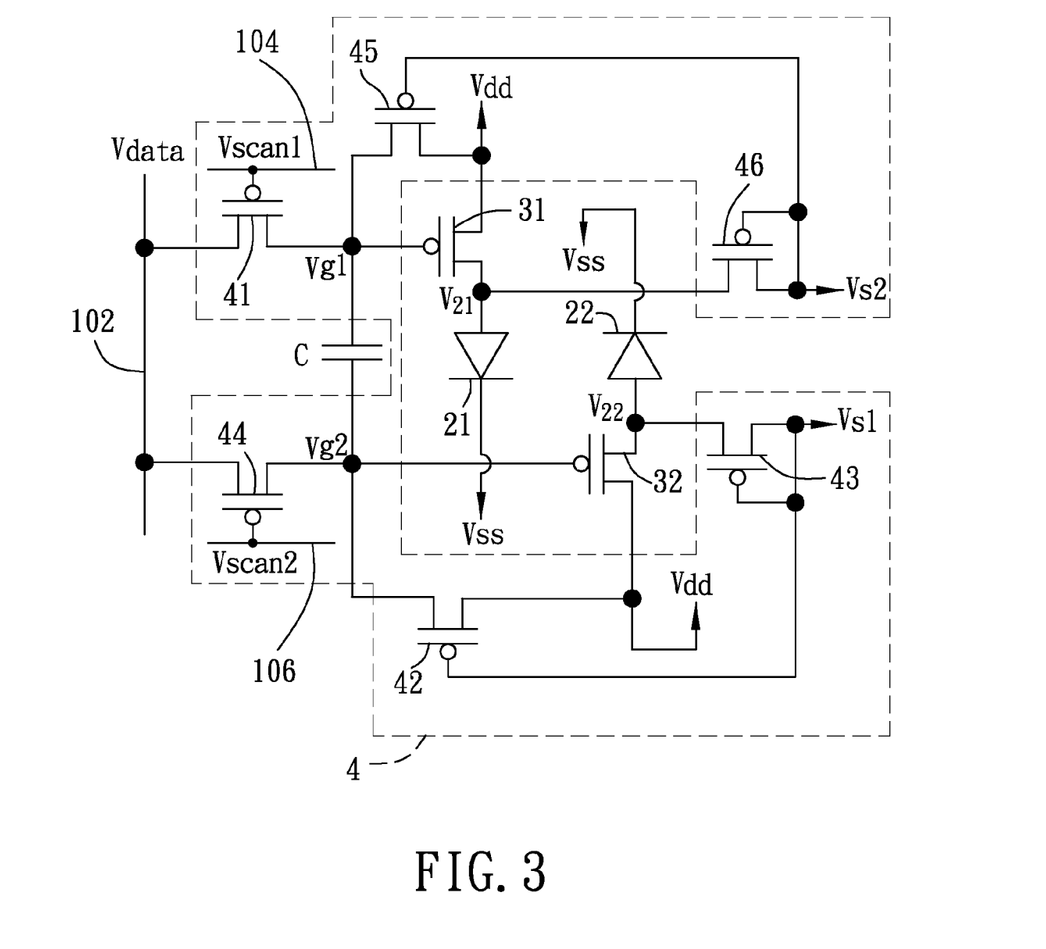
FIG. 3 is a schematic electrical circuit diagram illustrating the preferred embodiment of a dual-pixel circuit according to the present invention.
Figure 4A:
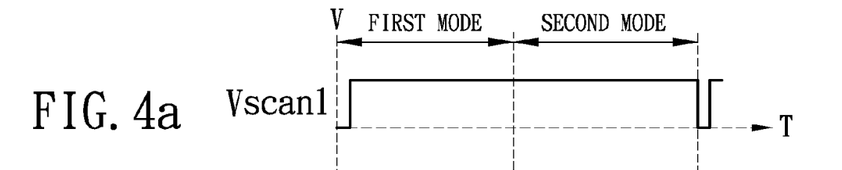
FIGS. 4a, 4b, 4c and 4d are timing diagrams illustrating a first scan voltage (Vscan1), a second scan voltage (Vscan2), a first bias signal (Vs1) and a second bias signal (Vs2), respectively.
Figure 4B:
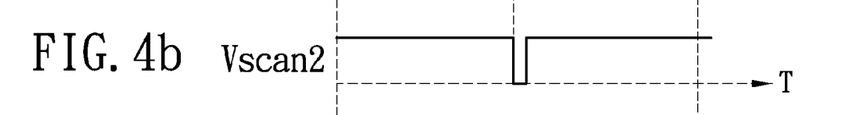
Figure 4C:
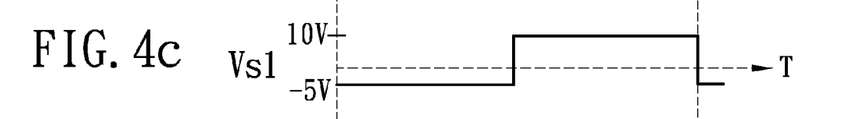
Figure 4D:
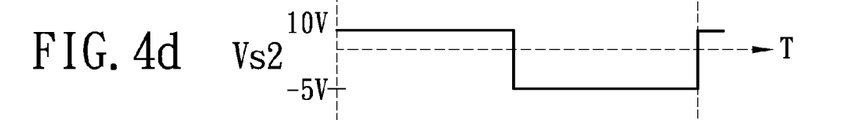
Figure 4E:
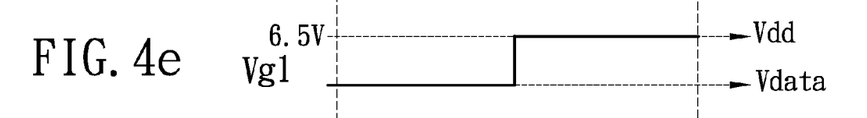
FIGS. 4e and 4f are timing diagrams illustrating first and second control voltages (Vg1, Vg2) for first and second driving transistors of the preferred embodiment, respectively.
Figure 4F:
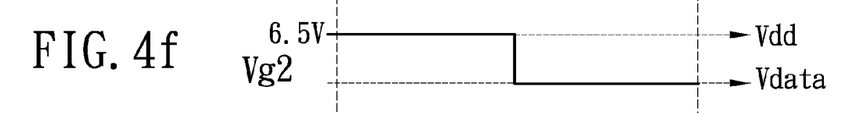
Figure 4G:
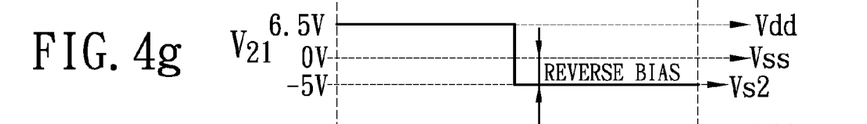
FIGS. 4g and 4h are timing diagrams illustrating voltages ($V_{21}$, $V_{22}$) applied to anodes of first and second organic light emitting diodes of the preferred embodiment, respectively.
Figure 4H:
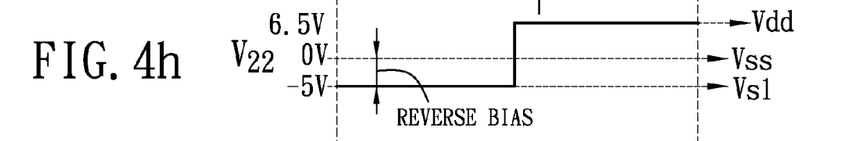
Figure 4I:
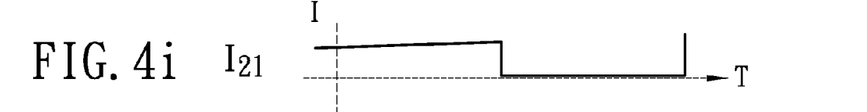
FIGS. 4i and 4j are timing diagrams illustrating currents ($I_{22}$, $I_{22}$) flowing through the first and second organic light emitting diodes.
Figure 4J:
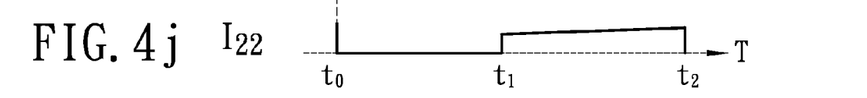
Figure 5:
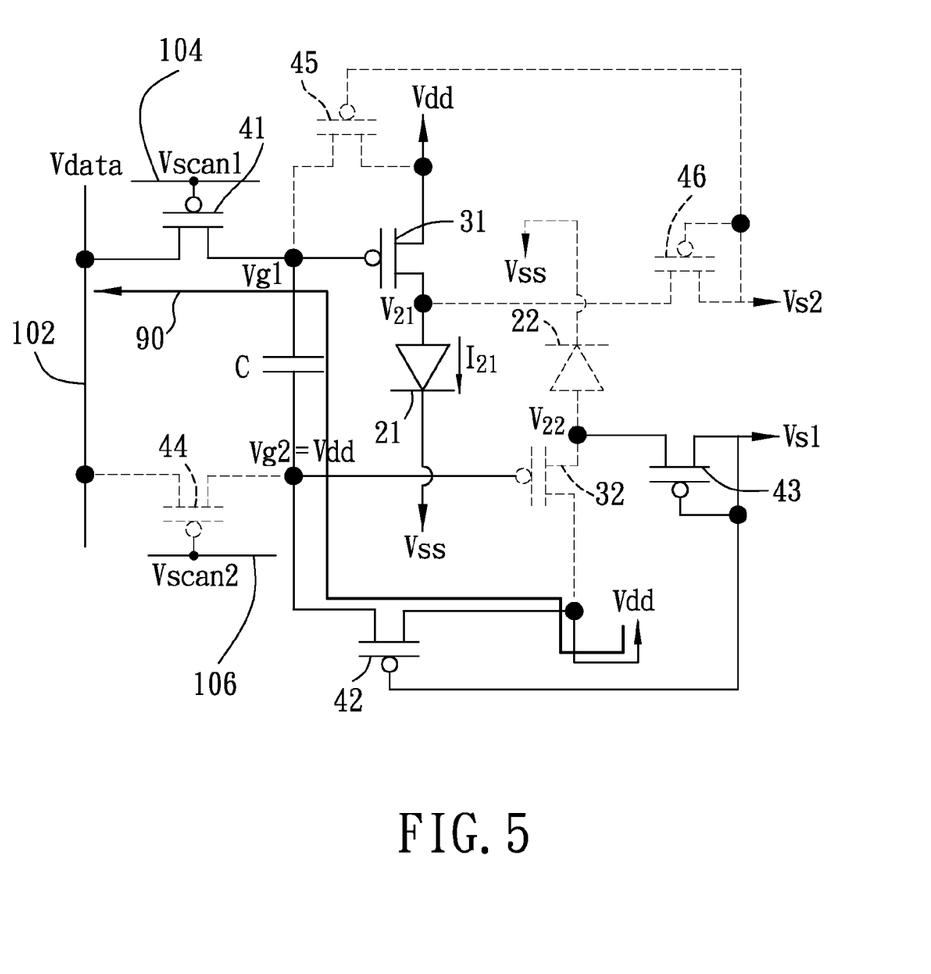
FIG. 5 is a schematic equivalent electrical circuit diagram illustrating the preferred embodiment when a switching module is operated in a first mode.
Figure 6:
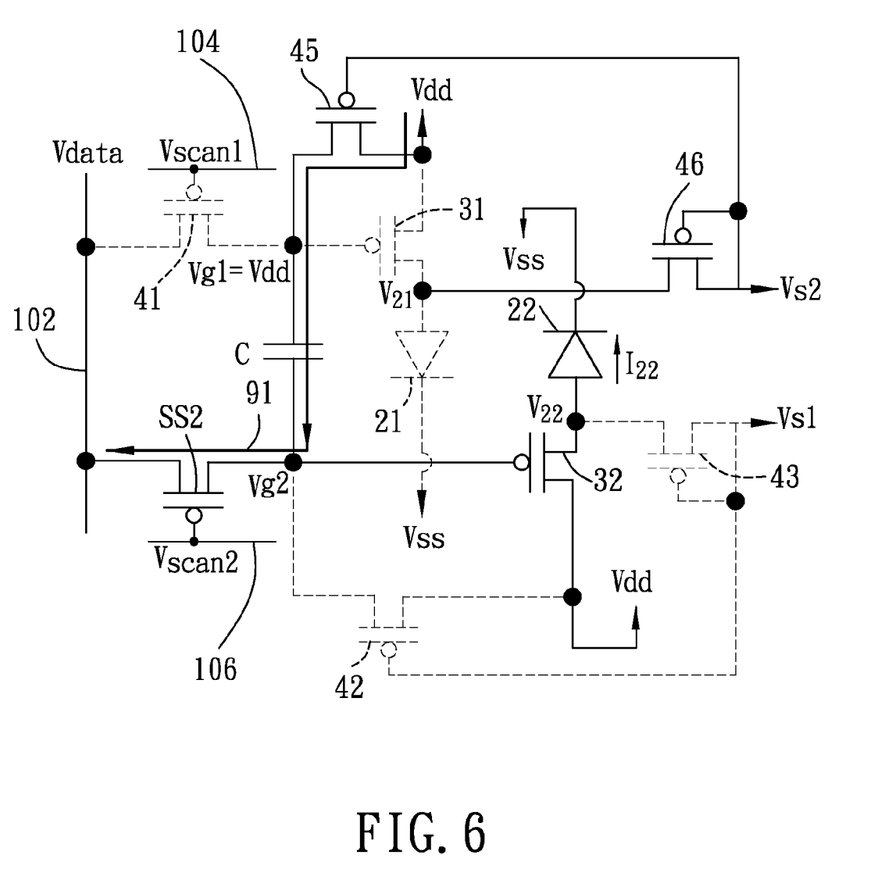
FIG. 6 is a schematic equivalent electrical circuit diagram illustrating the preferred embodiment when the switching module is operated in a second mode.

Referring to FIG. 3, the preferred embodiment of a dual-pixel circuit for an AMOLED according to the present invention is shown to include a pair of first and second organic light emitting diodes (OLEDs) 21, 22, and a driving circuit. The dual-pixel circuit is formed in a region where a data line 102 intersects first and second scan lines 104, 106.

Each of the first and second OLEDs 21, 22 is an active OLED, and has an anode, and a cathode adapted for receiving a low-level bias voltage (Vss), for example, equal to 0V.

The driving circuit includes a first driving transistor 31, a second driving transistor 32, a capacitor (C), and a switching module 4.

The first driving transistor 31 has a first end adapted for receiving a light-level bias voltage (Vdd), for example, equal to 6.5V, a second end coupled to the anode of the first OLED 21, and a control end for receiving a first control voltage (Vg1) such that the first driving transistor 31 is operable between an ON-state and an OFF-state in response to the first control voltage (Vg1).

The second driving transistor 32 has a first end adapted for receiving the high-level bias voltage (Vdd), a second end coupled to the anode of the second OLED 22, and a control end for receiving a second control voltage (Vg2) such that the second driving transistor 32 is operable between an ON-state and an OFF-state in response to the second control voltage (Vg2).

The capacitor (c) is coupled between the control ends of the first and second driving transistors 31, 32.

The switching module 4 is coupled to the anodes of the first and second OLEDs 21, 22 and to the control ends of the first and second driving transistors 31, 32. The switching module 4 is adapted to receive a data voltage (Vdata) supplied from the data line 102 and ranging from 0V to 5V, for example, a first scan voltage (Vscan1) supplied from the first scan line 104, a second scan voltage (Vscan2) supplied from the second scan line 106, a first bias signal (Vs1) ranging from −5V to 10V, for example, and a second bias signal (Vs2) ranging from 10V to −5V, for example. The switching module 4 is operable, based on the first and second scan voltages (Vscan1, Vscan2), and the first and second bias signals (Vs1, Vs2), between a first mode and a second mode.

In this embodiment, the switching module 4 includes a first switch 41, a second switch 42, a third switch 43, a fourth switch 44, a fifth switch 45, and a sixth switch 46.

The first switch 41 has a first end adapted to be coupled to the data line 102 for receiving the data voltage (Vdata) therefrom, a second end coupled to the control end of the first driving transistor 31, and a control end adapted to be coupled to the first scan line 104 for receiving the first scan voltage (Vscan1) therefrom such that the first switch 41 is operable between an ON-state and an OFF-state in response to the first scan voltage (Vscan1).

The second switch 42 has a first end adapted for receiving the high-level bias voltage (Vdd), a second end coupled to the control end of the second driving transistor 32, and a control end adapted for receiving the first bias signal (Vs1) such that the second switch 42 is operable between an ON-state and an OFF-state in response to the first bias signal (Vs1).

The third switch 43 has a first end adapted for receiving the first bias signal (Vs1), a second end coupled to the anode of the second OLED 22, and a control end adapted for receiving the first bias signal (Vs1) such that the third switch 43 is operable between an ON-state and an OFF-state in response to the first bias signal (Vs1).

The fourth switch 44 has a first end adapted to be coupled to the data line 102 for receiving the data voltage (Vdata) therefrom, a second end coupled to the control end of the second driving transistor 32, and a control end adapted to be coupled to the second scan line 106 for receiving the second scan voltage (Vscan2) therefrom such that the fourth switch 44 is operable between an ON-state and an OFF-state in response to the second scan voltage (Vscan2).

The fifth switch 45 has a first end adapted for receiving the high-level bias voltage (Vdd), a second end coupled to the control end of the first driving transistor 31, and a control end adapted for receiving the second bias signal (Vs2) such that the fifth switch 45 is operable between an ON-state and an OFF-state in response to the second bias signal (Vs2).

The sixth switch 46 has a first end adapted for receiving the second bias signal (Vs2), a second end coupled to the anode of the first OLED 21, and a control end adapted for receiving the second bias signal (Vs2) such that the sixth switch 46 is operable between an ON-state and an OFF-state in response to the second bias signal (Vs2).

In this embodiment, each of the first and second driving transistor 31, 32, and the first, second, third, fourth, fifth and sixth switches 41, 42, 43, 44, 45, 46 is a P-type thin film transistor.

Referring further to FIGS. 4a to 4j, and 5, the switching module 4 is operated in the first mode during a period from $t_0$ to $t_1$. In the first mode, the first scan voltage (Vscan1) is initially at a low level, the second scan voltage remains at a high level, the first bias signal (Vs1) is at a low level, and the second bias signal (Vs2) is at a high level. As such, the first, second and third switches 41, 42, 43 are in the ON-state, and the fourth, fifth and sixth switches 44, 45, 46 are in the OFF-state. Thus, the data voltage (Vdata) is transmitted by the switching module 4 to the control end of the first driving transistor 31 through the first switch 41, and serves as the first control voltage (Vg1) (see FIG. 4e) to thereby conduct the first driving transistor 31 such that the high-level bias voltage (Vdd) is transmitted to the anode of the first OLED 21 through the first driving transistor 31 and serves as a voltage (V21) applied to the anode of the first OLED 21 (see FIG. 4g). As a result, the first OLED 21 is forward-biased to emit light and permits a first driving current ($I_{21}$), which is produced by the first driving transistor 31, to flow therethrough (see FIG. 4i). In addition, the first bias signal (Vs1) is transmitted by the switching module 4 to the anode of the second OLED 22 through the third switch 43 and serves as a voltage ($V_{22}$) applied to the anode of the second OLED 22 (see FIG. 4h) such that the second OLED 22 is reverse-biased. Therefore, during the first mode of the switching module 4, degradation of the second OLED 22 can be alleviated.

On the other hand, in the first mode, since the first and second switches 41, 42 are in the ON-state, the capacitor (C) is charged with a current 90 flowing through the second and first switches 42, 41. In this case, the second control voltage (Vg2) is pulled up to the high-level bias voltage (Vdd) (see FIG. 4f). Thereafter, the first scan voltage (Vscan1) becomes a high level such that the first switch 41 is switched from the ON-state to the OFF-state. Thus, a voltage across the capacitor (C) becomes Vdd−Vdata. In addition, for the first driving transistor 31, since a voltage difference between the high-level bias voltage (Vdd) and the voltage (Vg1), i.e., Vdd−Vdata, is greater than a threshold voltage for conduction of the first driving transistor 31, the first driving current ($I_{21}$) produced by the first driving transistor 31 is proportional to Vdd−Vdata.

Referring further to FIGS. 4a to 4j, and 6, the switching module 4 is operated in the second mode during a period from $t_1$ to $t_2$. In the second mode, the first scan voltage (Vscan1) remains at the high level, the second scan voltage (Vscan2) initially becomes a low level, the first bias signal (Vs1) becomes a high level, and the second bias signal (Vs2) becomes a low level. As such, the first, second and third switches 41, 42, 43 are in the OFF-state, and the fourth, fifth and sixth switches 44, 45, 46 are in the ON-state. Thus, the data voltage (Vdata) is transmitted by the switching module 4 to the control end of the second driving transistor 32 through the fourth switch 44, and serves as the second control voltage (Vg2) (see FIG. 4f) to thereby conduct the second driving transistor 32 such that the high-level bias voltage (Vdd) is transmitted to the anode of the second OLED 22 through the second driving transistor 32 and serves as the voltage ($V_{22}$) (see FIG. 4h). As a result, the second OLED 22 is forward-biased to emit light and permits a second driving current ($I_{22}$), which is produced by the second driving transistor 32, to flow therethrough (see FIG. 4j). In addition, the second bias signal (Vs2) is transmitted by the switching module 4 to the anode of the first OLED 21 through the sixth switch 46 and serves as the voltage ($V_{21}$) applied to the anode of the first OLED 21 (see FIG. 4g) such that the first OLED 21 is reverse-biased. Therefore, during the second mode of the switching module 4, degradation of the first OLED 21 can be alleviated.

On the other hand, in the second mode, since the fourth and fifth switches 44, 45 are in the ON-state, the capacitor (C) is charged with a current 91 flowing through the fifth and fourth switches 45, 44. In this case, the first control voltage (Vg1) is pulled up to the high-level bias voltage (Vdd) (see FIG. 4e). Thereafter, the second scan voltage (Vscan2) restores to the high level such that the first switch 41 is switched from the ON-state to the OFF-state. Thus, a voltage across the capacitor (C) becomes Vdd−Vdata. In addition, for the second driving transistor 32, since a voltage difference between the high-level bias voltage (Vdd) and the voltage (Vg2), i.e., Vdd−Vdata, is greater than a threshold voltage for conduction of the second driving transistor 32, the second driving current ($I_{22}$) produced by the second driving transistor 32 is proportional to Vdd−Vdata.

It is noted that, when the switching module 4 is operated in the first mode, the voltage (Vg2) is pulled up to the high-level bias voltage (Vdd). When the switching module 4 is switched from the first mode to the second mode, the voltage (Vg2) reduces from the high-level bias voltage (Vdd) to the data voltage (Vdata). Similarly, when the switching module 4 is operated in the second mode, the voltage (Vg1) is pulled up to the high-level bias voltage (Vdd). When the switching module 4 is switched from the second mode to the first mode, the voltage (Vg1) reduces from the high-level bias voltage (Vdd) to the data voltage (Vdata). Since the voltages (Vg1, Vg2) vary along the same path in the hysteresis loop (L) of FIG. 2, the first and second driving currents ($I_{21}$, $I_{22}$) are identical to each other. Therefore, non-uniformity of brightness encountered in the prior art can be improved.

In sum, since the second OLED 22 is reverse-biased when the switching module 4 is operated in the first mode, and since the first OLED 21 is reverse-biased when the switch module 4 is operated in the second mode, degradation of the first and second OLEDs 21, 22 can be alleviated, thereby prolonging the lifetime of the first and second OLED 21, 22. Furthermore, since the first and second driving transistors 31, 32 have the same operation in response to the voltages (Vg1, Vg2), uniformity of brightness for the first and second OLEDs 21, 22 can be ensured.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A dual-pixel circuit comprising:
a pair of first and second organic light emitting diodes (OLEDs), each of said first and second OLEDs having an anode, and a cathode adapted for receiving a low-level bias voltage; and
a driving circuit including
a first driving transistor having a first end adapted for receiving a high-level bias voltage, a second end coupled to said anode of said first OLED, and a control end,
a second driving transistor having a first end adapted for receiving the high-level bias voltage, a second end coupled to said anode of said second OLED, and a control end,
a capacitor coupled between said control ends of said first and second driving transistors, and
a switching module coupled to said anodes of said first and second OLEDs and to said control ends of said first and driving transistors, said switching module being adapted to receive a data voltage, a first scan voltage, a second scan voltage, a first bias signal and a second bias signal such that said switching module is operable, based on the first and second scan voltages, and the first and second bias signals, between a first mode and a second mode;
wherein, when said switching module is operated in the first mode, said switching module transmits the data voltage to said control end of said first driving transistor to conduct said first driving transistor such that said first OLED is forward-biased to emit light, and transmits the first bias signal to said anode of said second OLED such that said second OLED is reverse-biased; and
wherein, when said switching module is operated in the second mode, said switching module transmits the data voltage to said control end of said second driving transistor to conduct said second driving transistor such that said second OLED is forward-biased to emit light, and transmits the second bias signal to said anode of said first OLED such that said first OLED is reverse-biased.

2. The dual-pixel circuit as claimed in claim 1, wherein said switching module of said driving circuit includes:
a first switch having a first end adapted for receiving the data voltage, and a second end coupled to said control end of said first driving transistor, and a control end adapted for receiving the first scan voltage such that said first switch is operable between an ON-state and an OFF-state in response to the first scan voltage;
a second switch having a first end adapted for receiving the high-level bias voltage, a second end coupled to said control end of said second driving transistor, and a control end adapted for receiving the first bias signal such that said second switch is operable between an ON-state and an OFF-state in response to the first bias signal;
a third switch having a first end adapted for receiving the first bias signal, a second end coupled to said anode of said second OLED, and a control end adapted for receiving the first bias signal such that said third switch is operable between an ON-state and an OFF-state in response to the first bias signal;
a fourth switch having a first end adapted for receiving the data voltage, and a second end coupled to said control end of said second driving transistor, and a control end adapted for receiving the second scan voltage such that said fourth switch is operable between an ON-state and OFF-state in response to the second scan voltage;
a fifth switch having a first end adapted for receiving the high-level bias voltage, a second end coupled to said control end of said first driving transistor, and a control end adapted for receiving the second bias signal such that said fifth switch is operable between ON-state and an OFF-state in response to the second bias signal; and
a sixth switch having a first end adapted for receiving the second bias signal, a second end coupled to said anode of said second OLED, and a control end adapted for receiving the second bias signal such that said sixth switch is operable between an ON-state and an OFF-state in response to the first bias signal;
when said switching module is operated in the first mode, said first, second and third switches being in the ON-state, and said fourth, fifth and sixth switches being in the OFF-state;
when said switching module is operated in the second mode, said first, second and third switches being in the OFF-state, and said fourth, fifth and sixth switches being in the ON-state.

3. The dual-pixel circuit as claimed in claim 2, wherein each of said first and second driving transistors, and said first, second, third, fourth, fifth and sixth switches is a P-type thin film transistor.

4. The dual-pixel circuit as claimed in claim 2, wherein:
When said switching module is operated in the first mode, the first bias signal has a voltage level less than the low-level bias voltage such that said second OLED is reverse-biased; and
When said switching module is operated in the second mode, the second bias signal has a voltage level less than the low-level bias voltage such that said first OLED is reverse-biased.

5. A driving circuit for a pair of first and second organic light emitting diodes (OLEDs), each of the first and second OLEDs having an anode, and a cathode for receiving a low-level bias voltage, said driving circuit comprising:
a first driving transistor having a first end adapted for receiving a high-level bias voltage, a second end adapted to be coupled to the anode of the first OLED, and a control end;
a second driving transistor having a first end adapted for receiving the high-level bias voltage, a second end adapted to be coupled to the anode of the second OLED, and a control end;
a capacitor coupled between said control ends of said first and second driving transistors; and
a switching module adapted to be coupled to the anodes of the first and second OLEDs and to said control ends of said first and driving transistors, said switching module being adapted to receive a data voltage, a first scan voltage, a second scan voltage, a first bias signal and a second bias signal such that said switching module is operable, based on the first and second scan voltages, and the first and second bias signals, between a first mode and a second mode;
wherein, when said switching module is operated in the first mode, said switching module transmits the data voltage to said control end of said first driving transistor to conduct said first driving transistor such that the first OLED is forward-biased to emit light, and transmits the first bias signal to the anode of the second OLED such that the second OLED is reverse-biased; and
wherein, when said switching module is operated in the second mode, said switching module transmits the data voltage to said control end of said second driving transistor to conduct said second driving transistor such that the second OLED is forward-biased to emit light, and transmits the second bias signal to the anode of the first OLED such that the first OLED is reverse-biased.

6. The driving circuit as claimed in claim 5, wherein said switching module of said driving circuit includes:
- a first switch having a first end adapted for receiving the data voltage, and a second end coupled to said control end of said first driving transistor, and a control end adapted for receiving the first scan voltage such that said first switch is operable between an ON-state and an OFF-state in response to the first scan voltage;
- a second switch having a first end adapted for receiving the high-level bias voltage, a second end coupled to said control end of said second driving transistor, and a control end adapted for receiving the first bias signal such that said second switch is operable between an ON-state and an OFF-state in response to the first bias signal;
- a third switch having a first end adapted for receiving the first bias signal, a second end adapted to be coupled to the anode of the second OLED, and a control end adapted for receiving the first bias signal such that said third switch is operable between an ON-state and an OFF-state in response to the first bias signal;
- a fourth switch having a first end adapted for receiving the data voltage, and a second end coupled to said control end of said second driving transistor, and a control end adapted for receiving the second scan voltage such that said fourth switch is operable between an ON-state and OFF-state in response to the second scan voltage;
- a fifth switch having a first end adapted for receiving the high-level bias voltage, a second end coupled to said control end of said first driving transistor, and a control end adapted for receiving the second bias signal such that said fifth switch is operable between ON-state and an OFF-state in response to the second bias signal; and
- a sixth switch having a first end adapted for receiving the second bias signal, a second end adapted to be coupled to the anode of the second OLED, and a control end adapted for receiving the second bias signal such that said sixth switch is operable between an ON-state and an OFF-state in response to the first bias signal;
- when said switching module is operated in the first mode, said first, second and third switches being in the ON-state, and said fourth, fifth and sixth switches being in the OFF-state;
- when said switching module is operated in the second mode, said first, second and third switches being in the OFF-state, and said fourth, fifth and sixth switches being in the ON-state.

7. The driving circuit as claimed in claim 6, wherein each of said first and second driving transistors, and said first, second, third, fourth, fifth and sixth switches is a P-type thin film transistor.

8. The driving circuit as claimed in claim 6, wherein:
When said switching module is operated in the first mode, the first bias signal has a voltage level less than the low-level bias voltage such that the second OLED is reverse-biased; and
When said switching module is operated in the second mode, the second bias signal has a voltage level less than the low-level bias voltage such that the first OLED is reverse-biased.

\* \* \* \* \*